H. L. ESHELMAN.
Harrow.
No. 67,178.
Patented July 30, 1867.
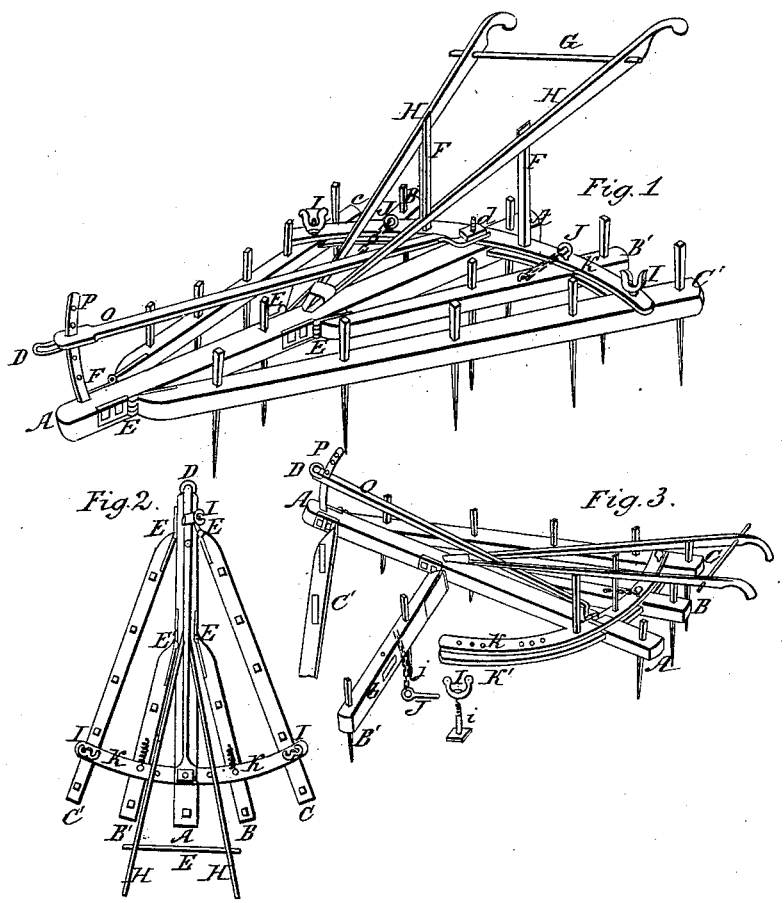
Witnesses.
Saml. Eby
H. M. Breneman
Inventor.
Henry L. Eshelman

United States Patent Office.

HENRY L. ESHELMAN, OF ELIZABETHTOWN, PENNSYLVANIA.

Letters Patent No. 67,178, dated July 30, 1867.

---

IMPROVEMENT IN HARROWS.

---

*The Schedule referred to in these Letters Patent and making part of the same.*

---

TO ALL WHOM IT MAY CONCERN:

Be it known that I, HENRY L. ESHELMAN, of Elizabethtown, in the county of Lancaster, and State of Pennsylvania, have invented a new and useful Improvement on Harrows for covering corn, &c.; and I do hereby declare that the following is a full and exact description of the construction and operation of the same, reference being had to the accompanying drawings, making a part of this specification, in which—

Figure 1 is a perspective view.

Figure 2, a bird's-eye view.

Figure 3 showing parts drawn out to exhibit their combination and framing.

The nature of my invention consists in making the harrow adjustable to the width of ground between the rows, and so as to adapt it for two horses and straddling the rows for covering corn after planting, or covering thicker by closing the wings.

To enable others skilled in the art to make and use my invention, I will proceed and describe its construction and operation.

I construct my harrow with a central beam, A, fig. 1, on which the united handles H H G are affixed. Said handles are supported by uprights F from the curved cross-piece K. In front, on A, there is a perforated curved piece, P; passing through a slot in the pole O, and by which said pole can be raised or lowered to regulate the action of the harrow, and held in place when adjusted by a headed screw-bolt and nut I. Said pole O is terminated by a clevis, D, and hooked to the curved cross-piece K behind, passing between the handles near their union, as shown. On each side of the centre beam A there are two wing-beams, B B' C C', connected thereto by a hinge at E, each having its independent motion on its hinge, and the curved cross-pieces K K'. Each of the wing-beams B B' and C C' has a mortise for the passage of the under-curved cross-piece K'. These curved cross-pieces K K' are formed by a radius adapted to the centre of action from the hinges on each side, forming a segment of a circle. These segments are pierced for adjustment by means of a ringed bolt, J, or, as shown, on the outer beams by a headed screw-bolt and thumb-nut, I i. The upper segment or cross-piece K being on top of the beams A B C, and the lower cross-piece K' passes through said beams or mortises aforementioned, the bolts I J passing through the segments and beams at the points made adjustable by a series of holes through said segments, as shown by fig. 3, where the two side beams are drawn out entirely from the two-curved pieces or segments K K' to show the mortise in B'. Fig. 1 so clearly shows all its parts in place that the foregoing description is deemed amply sufficient. The teeth are all shown in place; those in the centre beam A are removed when used for straddling the rows in harrowing the corn just scored and planted.

This harrow may be made of a size suitable for one or two horses, and is also readily converted into a cultivator by providing the beam with holes for the shovels, but I do not claim the hinged side pieces, &c., for a cultivator, as such may be in use; but I am not aware that a harrow has ever before been made adjustable by hinged side beams and curved cross-pieces applied or arranged and operated in the manner set forth.

What I claim as my invention, and desire to secure by Letters Patent, is—

The arrangement of the double segments or curved cross-pieces K K', in combination with the adjustable pole O P and hinged side pieces or beams B B' and C C', in the manner and for the purpose specified.

HENRY L. ESHELMAN.

Witnesses:
SAML. EBY,
H. M. BRENEMAN.